(Model.)
L. WAGONER.
APPARATUS FOR AGING WINES.
No. 429,826. Patented June 10, 1890.
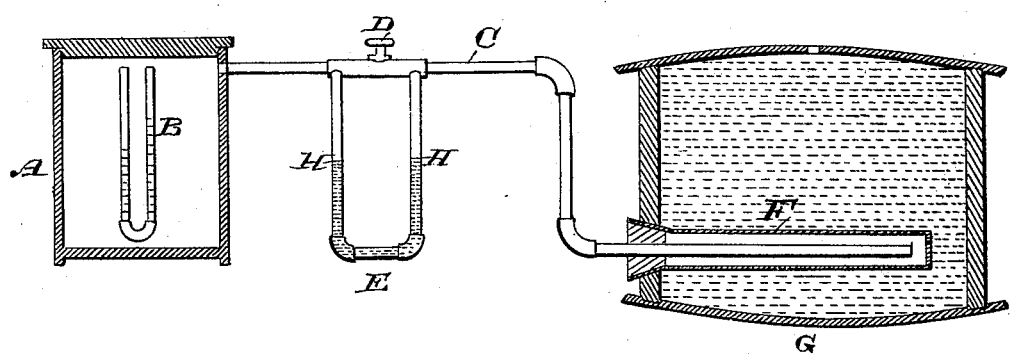
Witnesses,
Geo. H. Strong.
J. H. Nourse
Inventor,
L. Wagoner
By Dewey & Co.
Attys

UNITED STATES PATENT OFFICE.

LUTHER WAGONER, OF SAN FRANCISCO, CALIFORNIA.

APPARATUS FOR AGING WINES.

SPECIFICATION forming part of Letters Patent No. 429,826, dated June 10, 1890.

Application filed November 10, 1888. Serial No. 290,480. (Model.)

*To all whom it may concern:*

Be it known that I, LUTHER WAGONER, of the city and county of San Francisco, State of California, have invented an Improvement in Apparatus for Aging Wines; and I hereby declare the following to be a full, clear, and exact description of the same.

My invention relates to the artificial aging of wines and distilled alcoholic liquors; and it consists in a means for gradually supplying a small quantity of air, which is caused to flow continuously and steadily into the liquor to be treated, and in a means for filtering said air before it is introduced into the liquor.

Referring to the accompanying drawing for a more complete explanation of my invention, the figure is a vertical section taken through my apparatus, showing the manner of introducing the air into a cask of wine.

Wines are at present aged by the slow absorption of the oxygen of the air through the pores of the wood of which the cask is made, about fifteen to twenty per cent., by volume, of air being required to age the wine in from four to five years. Should the air be introduced into the liquor too rapidly or directly, the process may be endangered by giving the wine an undesirable flavor, and also by exciting a new fermentation, either by the introduction of germs to the wine, or, if the germs are already in the wine, in supplying oxygen in sufficient quantities to produce their growth.

The object of my invention is to introduce purified air into the cask in a slow and regular manner, and so gradually that the oxygen may only react upon the acids in the wine, and not be present in sufficient quantity to unduly permit the said reaction or to excite the latent germs, if they be present.

To carry out this invention I employ a hollow plug F, which may be of any suitable shape or size, and is introduced into or fixed within the cask at a point near the bottom, as shown. This plug has thin walls, which are from one-eighth to one-fourth of an inch thick, or sufficient so that under small pressure the air will readily filter through the pores of the wood and be absorbed by the wine. At the same time the thickness of the wood is sufficient to prevent the air flowing in with any great degree of freedom, and the wood acts as a filter to prevent the ingress of germs. This plug may be fitted into the bottom or lower part of the cask in any suitable way, and a pipe C, leading from the air-compressor or reservoir A, has its end cemented or otherwise attached to the open end of the plug, so as to convey the air thereto. Within the reservoir or tank A is fitted a mercury-gage B, which will show the pressure in the tank at all times. The small quantity of nitrogen being under pressure, slowly filters through the wood of the casks, while the oxygen is absorbed and unites with the wine. I have found that a pressure of twelve to twenty feet of water is sufficient to force air rapidly enough (a few gallons per day) through the plug. I prefer to use a plug of California redwood, whose walls are about one-eighth of an inch thick, as being the cheapest and easiest mode, and it will impart no bad flavor to the wine in the cask.

D is a cock fitted into the pipe C, so as to cut off the flow of air whenever desired.

E is a U-shaped pipe, the upper ends or legs of which connect with the pipe C upon each side of the cock D, the pipe E depending in a curve below the pipe C, as shown. This tube has a known capacity, and is filled with mercury to the line H, and it is used to measure the rate of flow of the air into the cask.

The tank A is filled with air compressed sufficiently to overcome the pressure of the liquid in the cask, and when the cock D is open the flow will commence through the pipe C and the plug F.

If it be desired to determine the rate of the flow of the air, the cock D is closed and the pressure from the reservoir A, acting upon the mercury in the legs of the U-shaped pipe E, will force the mercury down in that leg of the pipe which is nearest to the tank or reservoir, while the mercury will rise in the other leg in proportion as it is depressed in the first one. The rate at which the mercury is thus moved will depend upon the rate at which the air is passing through the plug F, and as the capacity of the tube E is known it can be very easily determined, whenever desired, by closing the cock D temporarily.

Regarding the rate of admission of air, the process is substantially the following: During the natural period of aging (two to five years) the wine absorbs its own volume of air. Now suppose the cask contains one thousand gallons and it is desired to age the same in one hundred days, the air would be admitted at the rate of ten gallons per day. The rate of admission of air having been properly adjusted, the cock D remains open and the air flows at the determined rate through the plug F into the cask, it being understood that the cask will remain closed while air is introduced.

Any suitable form of meter may be employed in the place of or in connection with the mercury-tube E, so that the total flow may be recorded, if desired.

Having thus described my invention, what I claim as new, and desire to secure by Letters Patent, is—

1. An apparatus for aging wine or liquor, consisting of a containing-vessel, a hollow porous tube fixed therein, a receiver or chamber for containing air, means for compressing the air, and a pipe connecting said chamber with the porous tube, substantially as herein described.

2. An apparatus for aging wine or liquor, consisting of a hollow wooden tube fixed within the containing-vessel, a receiver or chamber for containing air, means for compressing the air, a pipe connecting the chamber with the wooden tube, and a meter connected with the supply-pipe, substantially as described.

3. The combination, with the cask or vessel containing a body of wine, of a porous plug let into the cask and adapted to deliver air thereto in a slow and regular manner, and an air-reservoir connected with the plug, substantially as described.

In witness whereof I have hereunto set my hand.

LUTHER WAGONER.

Witnesses:
S. H. NOURSE,
H. C. LEE.